United States Patent Office 3,537,087
Patented Oct. 27, 1970

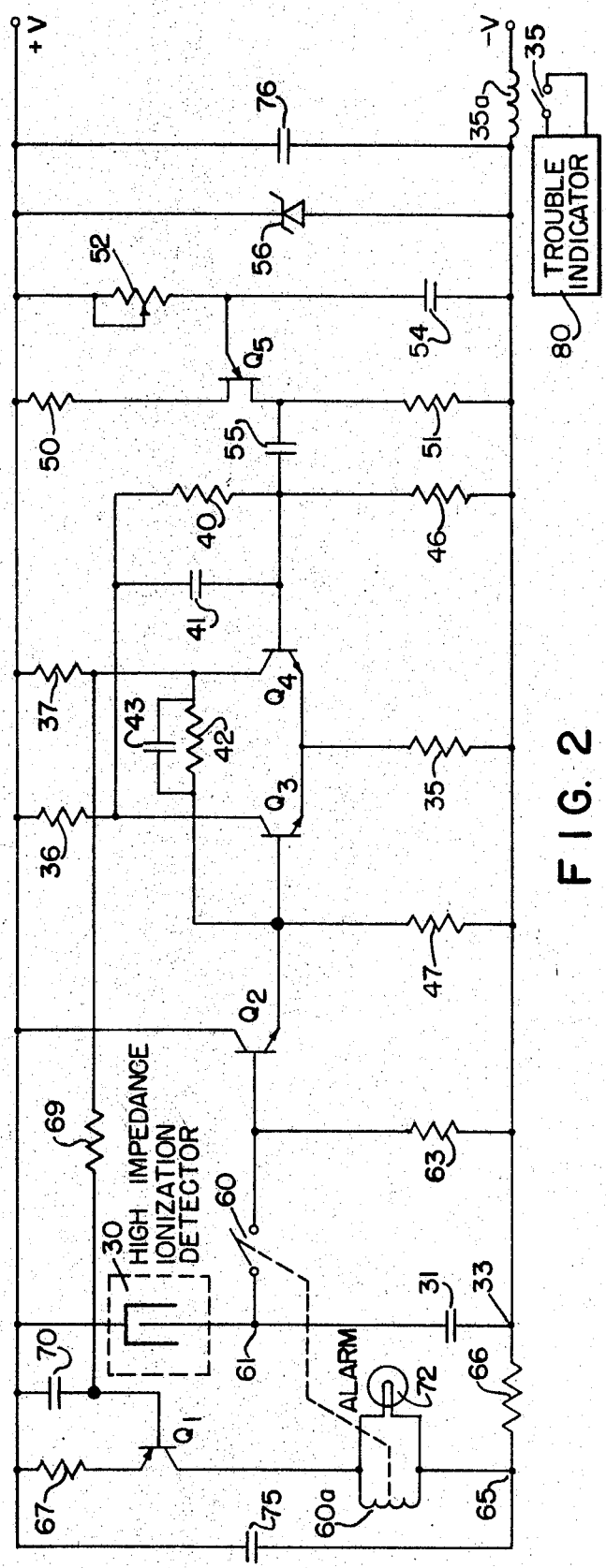
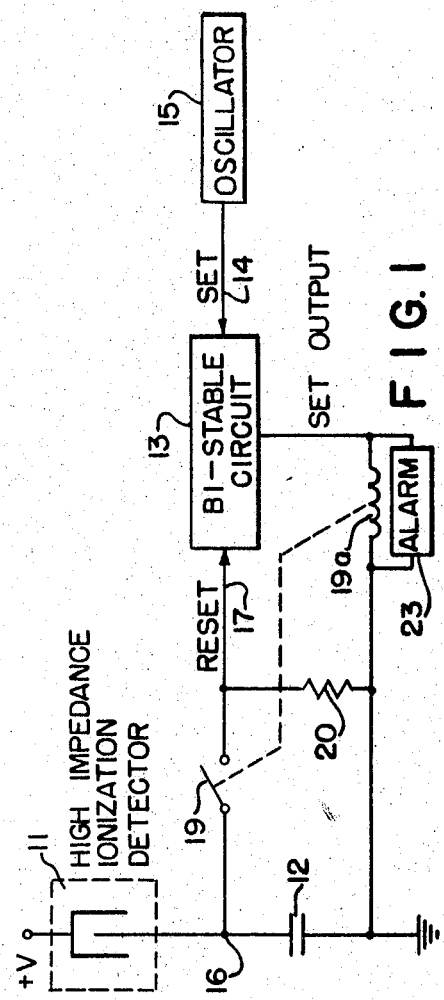

3,537,087
CAPACITOR POTENTIAL SAMPLING AND
INDICATING SYSTEM
William B. Osborne, Marlboro, Mass., assignor to Fenwal
Incorporated, Ashland, Mass., a corporation of Massachusetts
Filed Nov. 1, 1967, Ser. No. 679,831
Int. Cl. G08b 21/00
U.S. Cl. 340—237                                10 Claims

ABSTRACT OF THE DISCLOSURE

A readout circuit for intermittently sampling the potential developed by a high impedance detector and for providing an output indication when that potential does not rise to a predetermined level within a predetermined period. The readout circuit includes a bi-stable circuit having a Set and a Reset input. An oscillator provides a timed signal at the Set input whereupon the bistable circuit both changes state and provides an output signal to operate a switching circuit that couples the sampled potential to the Reset input of the bistable circuit. An alarm indication is manifested if the bistable circuits fails to Reset after a normal time period.

FIELD OF THE INVENTION

This invention relates in general to readout circuits for high impedance devices and more particularly to a readout circuit for intermittently sampling the potential of a high impedance variable potential source and producing an output signal indicating when that potential does not rise to a predetermined level.

PRIOR ART

There are a number of situations in which it is desired to sample the potential of a high impedance device in order to ascertain whether that potential lies above or below some predetermined level. Typical of such high impedance devices are ionization detectors in which the characteristic impedance may well be $10^{10}$ ohms or higher. Other devices of this type include charge amplifiers and vacuum photocell measuring circuits. In many applications of these detectors it is required that the potential of the detector be sampled intermittently to determine the state of some measured variable. One such situation arises in "smoke" detectors which employ on ionization chamber with an internal alpha radiation source to provide an early indication of the presence of combustion products in the atmosphere. Such a detector, under normal ambient conditions, maintains a relatively high current. An influx of combustion products, however, sharply decreases the current through the ionization detector. The decreased current is therefore indicative of the presence of the combustion products and should resulit in an alarm signal. There are a number of critical factors associated with reading out of this current. One such critical factor arises from the extremely high impedance of the ionization chamber. This impedance is typically greater than $10^{10}$ ohms and hence the elements necessary for readout must be of substantially higher impedance to avoid the shunting effect of leakage currents. A second critical factor arises from the fact that a direct current is to be measured and thus all of the problems usually associated with direct current measurements, such as drift, must be avoided. This problem is emphasized by the nature of the measurement situation in which the device needs to be operative for long periods of time during which the ambient conditions are normal, and yet it must respond quickly to the presence of combustion products.

One readout system, which has been employed with "smoke" detectors of the type discussed, employs a pair of oscillators, one oscillator being characterized by a shorter time constant than the other. The shorter time constant oscillator is employed to close a reed type relay which is connected at the junction between the ionization chamber and an associated capacitor. The effect of closing this relay is to sample the potential across the associated capacitor and, if this potential is above the predetermined level corresponding to normal ionization current conditions, the second slower oscillator is inhibited from firing a second relay. The second relay is, however, fired when the potential across the capacitor associated with the ionization chamber is below the predetermined level at the time of sampling. The firing of this second relay energizes the output alarm. This system is dependent upon the stability of the frequency and phase relationships between the two oscillators and any variation in these relationships, such as those caused by wide excursions in ambient temperature or circuit transients may result in false alarm signals. Thus not only is the system critical as to the voltage sensitivity of the inhibiting action, but it is also critical as to the time variations introduced by any component variations.

SUMMARY OF THE INVENTION

The readout circuit of the present invention includes a bi-stable circuit controlling a sampling switch to make intermittent determinations of the value of the potential across a capacitor to which current is supplied from the high impedance detector. The bi-stable circuit is characterized by having a Set and Reset input. An oscillator is coupled to the Set input and, upon receipt of a signal from the oscillator on the Set input, the bi-stable element both changes state and provides an output signal which closed a read type relay switch between the Rest input of the bis-state circuit and the junction between the high impedance detector and its associated capacitor. If the potential across this associated capacitor is above the predetermined value at which the Reset input triggers, then the closing of the sampling switch triggers the Reset action of the bi-stable circuit changing its state back to the original one and this change of state again opens the sampling switch. If on the other hand the potential across the associated capacitor is below the predetermined level, the bi-stable element is not triggered into its Reset state, the sampling switch is not reopened, and the maintaining of the bi-stable element in the Set condition for a period of time beyond the normal time necessary for Reset action triggers an alarm. Since the time factors are not at all critical, and since bi-stable elements, particularly those using solid state components, are capable of high stability the system is operative over a wide range of ambient conditions without false alarms.

Operation of the reed relay switch, of course, discharges the capacitor associated with the detector. If the bi-stable circuit is Reset, the voltage across the capacitor then begins to rise until the time that the oscillator again triggers the bi-stable circuit. Variations in the time constant which determines the frequency of the oscillator will result only in slight variations in the sampling duty cycle, and consequently, in the sensitivity to combustion products.

BRIEF DESCRIPTION OF THE DRAWING

In the drawing:

FIG. 1 is an illustration partially in block diagrammatic form and partially in schematic form of an alarm system employing the readout circuit of this invention; and FIG. 2 is an illustration in schematic form of a smoke alarm system embodying the readout circuit of this invention.

DESCRIPTION OF THE PREFERRED EMBODIMENT

While the readout circuit of the invention may be utilized in a number of systems having high impedance current sources one embodiment in which it has found particular application is in a combustion product or "smoke" detector system such as that illustrated in FIGS. 1 and 2. In the system illustrated in FIG. 1, a high impedance ionization detector 11 is connected in series with a capacitor 12 between a positive voltage supply at +V and a point of potential reference. A bi-stable circuit 13 has a Set input 14 which is actuated by an oscillator 15 and a Reset input 17. A high impedance reed switch 19 has one terminal connected to the junction 16 between the high impedance ionization detector 11 and capacitor 12 and the other terminal connected directly to the Reset input 17 of bi-stable circuit 13. The actuating coil 19a for reed switch 19 is connected between the Set output from bi-stable circuit 13 and the point of potential reference. An alarm element 23 is connected across the coil 19a. A resistor 20 provides a return path for discharging the voltage across the capacitor 12 when the reed switch 19 is closed.

The oscillator 15 may be any suitable oscillator providing an output wave form adapted to trigger the bi-stable circuit 13, when it is in the Reset state into the Set state. The bi-stable circuit 13, which may take any of several coventional forms, provides a Set output signal in response to the triggering of the Set input 14. This Set output signal, acting through the coil 19a, closes the normally open reed switch 19 thereby applying the stored potential across capacitor 12 directly to the Reset input 17 of the bi-stable circuit. If the value of this potential is sufficient to trigger the bi-stable circuit from its Set condition back into the Reset condition, then the current will be removed from the coil 19a. The removal of the current from 19a allows the reed switch 19 to again open. The alarm element 23 which is coupled across coil 19a has a response time characteristic such that it will not provide an alarm when the current flows through coil 19a for only a short period.

If, on the other hand, the potential across capacitor 12, at the time that the reed switch 19 is closed, is below the value necessary to trigger the bi-stable circuit 13 back into the Reset condition, then the current through coil 19a will remain and the alarm element 23 will provide an output alarm.

In operation the above circuit samples the potential across the capacitor 12 at predetermined intervals determined by the frequency of oscillator 15. If the potential across capacitor 12 is sufficiently high the bi-stable circuit is Reset, no alarm output is provided and the entire circuit is Reset in preparation for the next triggering pulse from oscillator 15. If the potential across capacitor 12 at the time of sampling has fallen below the predetermined level, the bi-stable circuit remains in its Set position and the alarm output is actuated. It should be noted that the alarm element 23 may be arranged such that it only provides an output signal when the current has been maintained on coil 19a for a period far exceeding even several sampling cycles, since the bi-stable circuit will not automatically Reset if the initial potential at the Reset terminal has failed to exceed the predetermined triggering level.

FIG. 2 is an illustration of a detailed circuit configuration of a combustion products detector embodying the readout circuit of the invention. A high impedance ionization detector 30 is connected in series with a capacitor 31 between a positive voltage terminal +V and a negative terminal 33 which is in turn connected through a trouble relay coil 35a to the negative voltage terminal −V. The high impedance ionization detector 30 is a conventional detector in the combustion products detection art and includes a source of alpha radiation to generate ionization within the chamber. An influx of combustion products into the chamber then decreases sharply the ionization current through the chamber. However, when the atmosphere within the chamber 30 is uncontaminated, a relatively steady state current flows through it charging the capacitor 31 to a positive value.

Transistors Q3 and Q4 together with their associated network of resistors and capacitors form a bi-stable circuit having a Set input at the base of transistor Q4 and a Reset input at the base of transistor Q3. The multivibrator includes the emitter resistor 35, as well as collector resistors 36 and 37. The base of transistor Q4 is coupled through the network of resistor 40 and capacitor 41 to the collector of transistor Q3 and similarly the base of transistor Q3 is coupled through resistor 42 and capacitor 43 to the collector of transistor Q4. The values of the bi-stable circuit network are selected such that a positive voltage above a predetermined amplitude value applied across resistor 46 between the base of transistor Q4 and the negative terminal 33 will drive the circuit into its Set condition in which substantially all of the current is being drawn through collector resistor 37. Once driven into this state the bi-stable circuit will remain there until a voltage above a predetermined magnitude is applied across resistor 47 between the base of transistor Q3 and the negative terminal 33. When a voltage above the triggering level is applied across resistor 47, the bi-stable circuit reverts to its Reset condition in which substantially all of the current is being drawn through collector resistor 36. The resistor 47 also serves as the emitter resistor for transistor Q2 which acts as an emitter follower at the Reset input to the bi-stable circuit.

The Set input to the circuit is derived from an oscillator formed of the elements including the uni-junction transistor Q5, its series resistors 50 and 51 and the series combination of potentiometer 52 and capacitor 54. These elements form an oscillator with the frequency of the oscillator controlled by the characteristic of the uni-junction transistor Q5 and the RC time constant of the potentiometer 52 and capacitor 54. The output from this oscillator is connected through coupling capacitor 55 to the base of transistor Q4 which is the Set input terminal for the bi-stable circuit. A Zener diode 56 is connected between the +V terminal and terminal 33 and regulates not only the voltage across the oscillator but also the voltage supplied to the remainder of the circuit in the system.

As previously indicated the Reset input to the bi-stable circuit is derived from the emitter follower formed of transistor Q2 and resistor 47. The base of transistor Q2 is connected to one terminal of a reed switch 60, which has its other terminal connected to the junction 61 between the high impedance ionization detector 30 and its associated capacitor 31. The reed switch is a high impedance switch which is normally open and which is closed when current is passed through coil 60a. The base of transistor Q2 is also connected through resistor 63 to the negative terminal 33. The current supplied to the coil 60a is controlled by transistor Q1. The coil 60a is connected between the collector of this transistor and terminal 65 which is connected to terminal 33 by means of resistor 66. The emitter resistor 67 of transistor Q1 is connected directly to the positive voltage terminal +V. The base of the transistor Q1 is connected through resistor 69 to the collector of transistor Q4 in the bi-stable circuit and a bypass condenser 70 is also connected between the base of transistor Q1 and the positive voltage terminal +V.

A Set input signal to the bi-stable circuit reduces the voltage at the collector of transistor Q4 and hence applies a negative voltage to the base of PNP transistor Q1 thereby rendering this transistor conducting and drawing current through coil 60a. Thus the application of the Set signal to the bi-stable circuit closes the reed switch 60 applying the potential across capacitor 31 to the base of the emitter follower Q2. If the potential across capacitor 31 exceeds the critical voltage required to trigger the bi-stable circuit into its Reset condition, then the bi-stable circuit goes into the Reset condition increasing the potential at the collector of transistor Q4 cutting off the transistor Q1. When transistor Q1 is substantially cut off the reduced current in coil 60a causes the reed switch 60 to open. When the reed switch 60 was closed the potential on capacitor 31 was discharged through resistor 63 and the opening of this contact allows the capacitor 31 to again be recharged by the ionization current from detector 30.

If, at the time that the reed switch 60 is closed, the potential across capacitor 31 is below the critical value required to trigger the bi-stable circuit into its Reset condition, then the potential at the base of transistor Q1 remains negative and the reed switch 60 remains closed. An alarm element 72 is connected across the relay coil 60a. The alarm element 72 may be any convenient alarm indicator such as a lamp, but must be characterized by having a response time sufficiently slow so that in a normal Set-Reset cycle, when the potential across capacitor 31 is sufficient to trigger the bi-stable circuit, this alarm will not be set off. However, when the potential across capacitor 31 is insufficient and the reed switch 60 therefore remains closed for a longer period, the alarm does provide an indication of the reduced ionization current in the detector 30.

The value of resistor 63 preferably is such that together with the capacitor 31 the capacitor discharges through the resistor, when switch 60 is closed, in a time shorter than the response time of the alarm element 72. It is further preferable that the multivibrator switch from its reset state to its set state, in response o a signal applied to the base of transistor Q3, in less time than is required for the capacitor 31 to discharge through resistor 63.

Capacitors 75 and 76 are filter capacitors and do not otherwise affect the operation of the circuit. The relay coil 35a and its associated contact 35 is used to provide an indication on trouble indicator 80 in the event of a failure of the voltage applied between the terminals +V and −V. Typically the trouble indicator might take the form of a lamp.

In Table II below are listed components values which have proven satisfactory for the operation of the circuit illustrated in FIG. 2.

TABLE II

Transistors:
| | |
|---|---|
| Q1 | TIS04 |
| Q2, Q3, Q4 | 2N3856 |
| Q5 | 2N4853 |

Resistors:
| | | |
|---|---|---|
| 35 | ohms | 750 |
| 36 | do | $4.7 \times 10^3$ |
| 37 | do | $4.7 \times 10^3$ |
| 40 | do | $36 \times 10^3$ |
| 42 | do | $36 \times 10^3$ |
| 46 | do | $11 \times 10^3$ |
| 47 | do | $11 \times 10^3$ |
| 50 | do | 240 |
| 51 | do | 100 |
| 52 | do | $.5 \times 10^6$ |
| 63 | do | $20 \times 10^3$ |
| 66 | do | 470 |
| 67 | do | 300 |
| 69 | do | $5.1 \times 10^3$ |

Capacitors:
| | | |
|---|---|---|
| 31 | microfarads | $33 \times 10^{-6}$ |
| 41 | do | $100 \times 10^{-6}$ |
| 43 | do | $100 \times 10^{-6}$ |
| 54 | do | 10 |
| 55 | do | .01 |
| 70 | do | .47 |
| 75 | do | 10 |
| 76 | do | 100 |

While the readout detector has been illustrated in terms of a particular configuration in a smoke detector embodiment, it is apparent that other detailed circuit configurations may be employed, as well as modifications to the circuit shown. For example, in order to make the sensitivity of the readout detector adjustable, the frequency of the oscillator may be adjusted in any conventional fashion. Having described the invention, various modifications and improvements will occur to those skilled in the art and the invention disclosed herein should be construed as limited as only by the spirit and scope of the appended claims.

What is claimed is:

1. A readout circuit for indicating when the potential across a capacitor, which receives charge from a high impedance current source, exceeds a specified magnitude in a first direction, said circuit comprising, bi-stable means having first and second stable operative states;

first and second input terminals connected to said bi-stable means for controlling the state of said bi-stable means, said bi-stable means being set to said first state in response to a signal applied to said first terminal and being reset to said second state in response to a signal having a voltage amplitude exceeding said specified magnitude in a second direction applied to said second terminal;

a signal generator for providing signal to said first terminal at periodic intervals;

switching means for coupling and decoupling said capacitor to said second terminal;

actuating means responsive to the condition of said bi-stable means to actuate said switching means for coupling said capacitor to said second terminal only when said bi-stable means is in said first state;

and means responsive to the maintaining of said bi-stable means in said first state beyond a specified time duration for providing an output indication that said capacitor potential exceeds said specified magnitude in said first direction.

2. A readout circuit in accordance with claim 1 wherein said signal generator comprises an oscillator producing a regular voltage wave form, the maximum amplitude of said wave form exceeding the amplitude of the signal required to set said bi-stable means into said first state.

3. A readout circuit in accordance with claim 1 wherein said switching means is formed of a relay and wherein said actuating means comprises a circuit for applying current through the coil of said relay.

4. A readout circuit in accordance with claim 3 wherein said relay has normally open contacts and wherein the application of current through the coil of said relay closes said contacts.

5. A readout circuit in accordance with claim 4 wherein said indicating means comprises a lamp connected in parallel with the coil of said relay.

6. A readout circuit in accordance with claim 1 wherein said bi-stable means comprises first and second transistors interconnected to form a multivibrator.

7. A readout circuit in accordance with claim 1 wherein said high impedance source potential appears across a capacitor, said switching means being connected directly to one side of said capacitor, and said second input terminal of said bi-stable means being connected through a resistor to the other side of said capacitor, the values of said capacitor and resistor being such that the potential across said capacitor is discharged through said resistor when said switch is actuated in a time substantially less than said specified time duration for producing said output indication.

8. A readout detector in accordance with claim 7 wherein said bi-stable means is formed as a multivibrator having first and second transistors, the response time of said multivibrator to a signal on its second input terminal being substantially less than the discharge time constant for said high impedance source capacitor when said switch is actuated.

9. A system for providing an output indication of the presence of combustion products in a gaseous environment and including an ionization detector having an associated capacitor, said ionization detector being arranged to provide an ionization current at a first level when said gaseous environment is normal thereby charging said associated capacitor to a first potential, said ionization detector producing a reduced amount of current when said gaseous environment includes a significant portion of combustion products; said system further comprising, bi-stable means having first and second stable operative states;

first and second input terminals connected to said bi-stable means for controlling the state of said bi-stable means, said bi-stable means being set to said first state in response to a signal applied to said first terminal and being reset to said second state in response to a signal applied to said second terminal with a voltage amplitude responsive to a potential across said associated capacitor in excess of said first potential;

a signal generator for providing a signal to said first terminal at timed intervals;

switching means for coupling and decoupling said associated capacitor to said second terminal;

actuating means responsive to the condition of said bi-stable means to actuate said switching means for coupling said associated capacitor to said second terminal only when said bi-stable means is in said first state; and means responsive to the maintaining of said bi-stable means in said first state beyond a specified time duration for providing an output indication of the presence of a significant portion of combustion products in said gaseous environment.

10. Electrical monitoring apparatus for reporting when the potential across a capacitor exceeds a selected magnitude in a first direction, said apparatus comprising, a pair of terminals for connection across said capacitor;

a resistive element connected at one of two ends thereof to one of said terminals;

switching means having a normally-open single-pole, single-throw conduction path controllable by the signal applied to terminal means thereon, and having said conduction path connected between the other of said terminals and the other end of said resistor;

timing means producing an output signal at regularly-spaced intervals;

a bi-stable circuit
  (1) having first and second stable states and producing an output signal when in first state,
  (2) connected with said timing means to be switched to said first state by said timing output signal,
  (3) connected in circuit with said resistive element to be switched to said second state when the capacitor potential applied to said resistor by said switching means exceeds said selected magnitude in one direction, and
  (4) connected to apply said output signal to said terminal means of said switching means for closing the conduction path of said switching means only when in said first state, so that said capacitor potential between said terminals is applied to said resistive elements only when said bistable circuit is in said first state; and output means producing an output report in response to said bi-stable circuit being in said first state for more than a selected time.

References Cited

UNITED STATES PATENTS

| | | | |
|---|---|---|---|
| 3,064,165 | 11/1962 | Kennedy | 317—148.5 |
| 3,159,772 | 12/1964 | Van Doorn. | |
| 3,330,997 | 7/1967 | Keprta | 317—148.5 |
| 3,336,511 | 8/1967 | Wajs | 340—248 |
| 3,350,703 | 10/1967 | Johnson | 340—237 |
| 3,384,789 | 5/1968 | Teshima | 317—148.5 |
| 3,393,319 | 7/1968 | Randall et al. | 250—218 |
| 3,401,312 | 9/1968 | Eckl | 317—148.5 |

THOMAS B. HABECKER, Primary Examiner

D. MYER, Assistant Examiner

U.S. Cl. X.R.

320—1; 324—61; 328—151; 307—235, 247; 317—146, 148.5; 340—248